(12) United States Patent
Llamas Virgen et al.

(10) Patent No.: US 11,991,425 B2
(45) Date of Patent: May 21, 2024

(54) MULTIMEDIA STREAM ENHANCEMENT AND TAILORED PROCESSING

(71) Applicant: INTERNATIONAL BUSINESS MACHINES CORPORATION, Armonk, NY (US)

(72) Inventors: Paul Llamas Virgen, Guadalajara (MX); Emmanuel Barajas Gonzalez, Fremont, CA (US); Humberto Orozco Cervantes, Tonalá (MX); Shaun E. Harrington, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/045,506

(22) Filed: Oct. 11, 2022

(65) Prior Publication Data
US 2024/0121484 A1    Apr. 11, 2024

(51) Int. Cl.
*H04N 21/84* (2011.01)
*G06F 3/01* (2006.01)
*H04N 21/44* (2011.01)

(52) U.S. Cl.
CPC ............ *H04N 21/84* (2013.01); *G06F 3/013* (2013.01); *H04N 21/44008* (2013.01)

(58) Field of Classification Search
CPC ... H04N 21/84; H04N 21/44008; G06F 3/013
See application file for complete search history.

(56) References Cited

U.S. PATENT DOCUMENTS

| 7,693,965 | B2 | 4/2010 | Rhoads |
| 8,230,343 | B2 | 7/2012 | Logan et al. |
| 8,661,495 | B2 | 2/2014 | Reisman |
| 9,838,329 | B2 | 12/2017 | Sun et al. |
| 10,674,185 | B2 | 6/2020 | Thomas et al. |
| 11,263,385 | B1* | 3/2022 | Luk ........................ G06V 10/82 |

(Continued)

FOREIGN PATENT DOCUMENTS

| CN | 106664443 B | 3/2020 |
| JP | 5479504 B2 | 1/2012 |

(Continued)

OTHER PUBLICATIONS

"Segmenting a Content Stream", ip.com, IPCOM000207131D, May 17, 2011, 29 pgs.

*Primary Examiner* — Nnenna N Ekpo
(74) *Attorney, Agent, or Firm* — Tihon Poltavets; Matthew M. Hulihan; Heslin Rothenberg Farley & Mesiti PC

(57) ABSTRACT

Multimedia stream enhancement includes automatically analyzing a multimedia stream and identifying items of interest therein, building metadata, about the stream, that describes the identified items of interest and includes indications of each item of interest and a respective location of that item of interest, providing, by a stream producer device, the stream and the metadata to stream consumer devices, receiving feedback from at least one stream consumer device as the stream producer device provides the stream to the at least one stream consumer device, and using the feedback to generate updated metadata about the stream for provision to one or more stream consumer devices of the stream consumer devices.

20 Claims, 4 Drawing Sheets

(56) References Cited

U.S. PATENT DOCUMENTS

| | | |
|---|---|---|
| 11,290,783 B2 | 3/2022 | Neumann et al. |
| 2011/0131605 A1* | 6/2011 | Pratt ................ H04N 21/47815 |
| | | 715/764 |
| 2023/0237802 A1* | 7/2023 | Falendysz ............. B64C 39/024 |
| | | 382/104 |

FOREIGN PATENT DOCUMENTS

| | | |
|---|---|---|
| WO | 2018125557 A1 | 7/2018 |
| WO | 2018217501 A1 | 11/2018 |

* cited by examiner

MULTIMEDIA STREAM ENHANCEMENT AND TAILORED PROCESSING

BACKGROUND

Streaming content is a commonly used means of communication for educational, collaborative, social, and business activities. A massive amount of streamed content is generated and/or transferred daily on various social platforms, for instance. Depending on the context, streaming platforms have become, for many people, the primary way that they access information. Online classes, virtual conferences, work meetings, and many other forms of knowledge-sharing sessions are now performed using streaming platforms, leading to a proliferation of live and on-demand videos for educational, social, and business-related activities.

SUMMARY

Shortcomings of the prior art are overcome and additional advantages are provided through the provision of a computer-implemented method. The method automatically analyzes a multimedia stream and identifies, based on the analyzing, items of interest in the multimedia stream. The method builds metadata about the multimedia stream. The metadata describes the identified items of interest and includes, for each item of interest of the identified items of interest, an indication of the item of interest and an indication of a respective location, within video of the multimedia stream, of that item of interest. The method further provides, by a stream producer device, the multimedia stream and the metadata to stream consumer devices. Additionally, the method receives feedback from at least one stream consumer device of the of stream consumer devices as the stream producer device provides the multimedia stream to the at least one stream consumer device. The method also uses the feedback to generate updated metadata about the multimedia stream for provision to a stream consumer device of the stream consumer devices.

Further, a computer system is provided that includes a memory and a processor in communication with the memory, wherein the computer system is configured to perform a method. The method automatically analyzes a multimedia stream and identifies, based on the analyzing, items of interest in the multimedia stream. The method builds metadata about the multimedia stream. The metadata describes the identified items of interest and includes, for each item of interest of the identified items of interest, an indication of the item of interest and an indication of a respective location, within video of the multimedia stream, of that item of interest. The method further provides, by a stream producer device, the multimedia stream and the metadata to stream consumer devices. Additionally, the method receives feedback from at least one stream consumer device of the of stream consumer devices as the stream producer device provides the multimedia stream to the at least one stream consumer device. The method also uses the feedback to generate updated metadata about the multimedia stream for provision to a stream consumer device of the stream consumer devices.

Yet further, a computer program product including a computer readable storage medium readable by a processing circuit and storing instructions for execution by the processing circuit is provided for performing a method. The method automatically analyzes a multimedia stream and identifies, based on the analyzing, items of interest in the multimedia stream. The method builds metadata about the multimedia stream. The metadata describes the identified items of interest and includes, for each item of interest of the identified items of interest, an indication of the item of interest and an indication of a respective location, within video of the multimedia stream, of that item of interest. The method further provides, by a stream producer device, the multimedia stream and the metadata to stream consumer devices. Additionally, the method receives feedback from at least one stream consumer device of the of stream consumer devices as the stream producer device provides the multimedia stream to the at least one stream consumer device. The method also uses the feedback to generate updated metadata about the multimedia stream for provision to a stream consumer device of the stream consumer devices.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for enhancement of multimedia streams and tailored processing thereof. Despite the proliferation of streaming content and platform usage, as well as the ever-expanding capabilities of streaming platforms, the task of identifying and capturing items of interest, e.g., relevant content/information, shared in a stream of multimedia (also referred to herein as "multimedia stream" or just "stream"), is largely unfamiliar. Aspects described herein provide algorithms, approaches, and methodologies to perform real-time analysis of the audio and/or video information of a stream to identify items of interest (e.g., based on relevancy) to consumers of the stream ("stream consumers") and enhance the stream by providing metadata describing items of interest to the stream consumers. This might be performed, for instance, by a device of the stream producer/user, i.e., the stream producer device. A stream producer can possess the processing power and other resources sufficient for analyzing the stream and producing metadata describing items of interest in the stream. Stream consumer devices (such as mobile devices) are less likely to possess such resources. As used herein, "stream producer" and "stream consumer" could refer to the users producing/consuming the multimedia and/or the devices producing/consuming the multimedia streaming content for display to those users who are using such devices.

Figure 1:
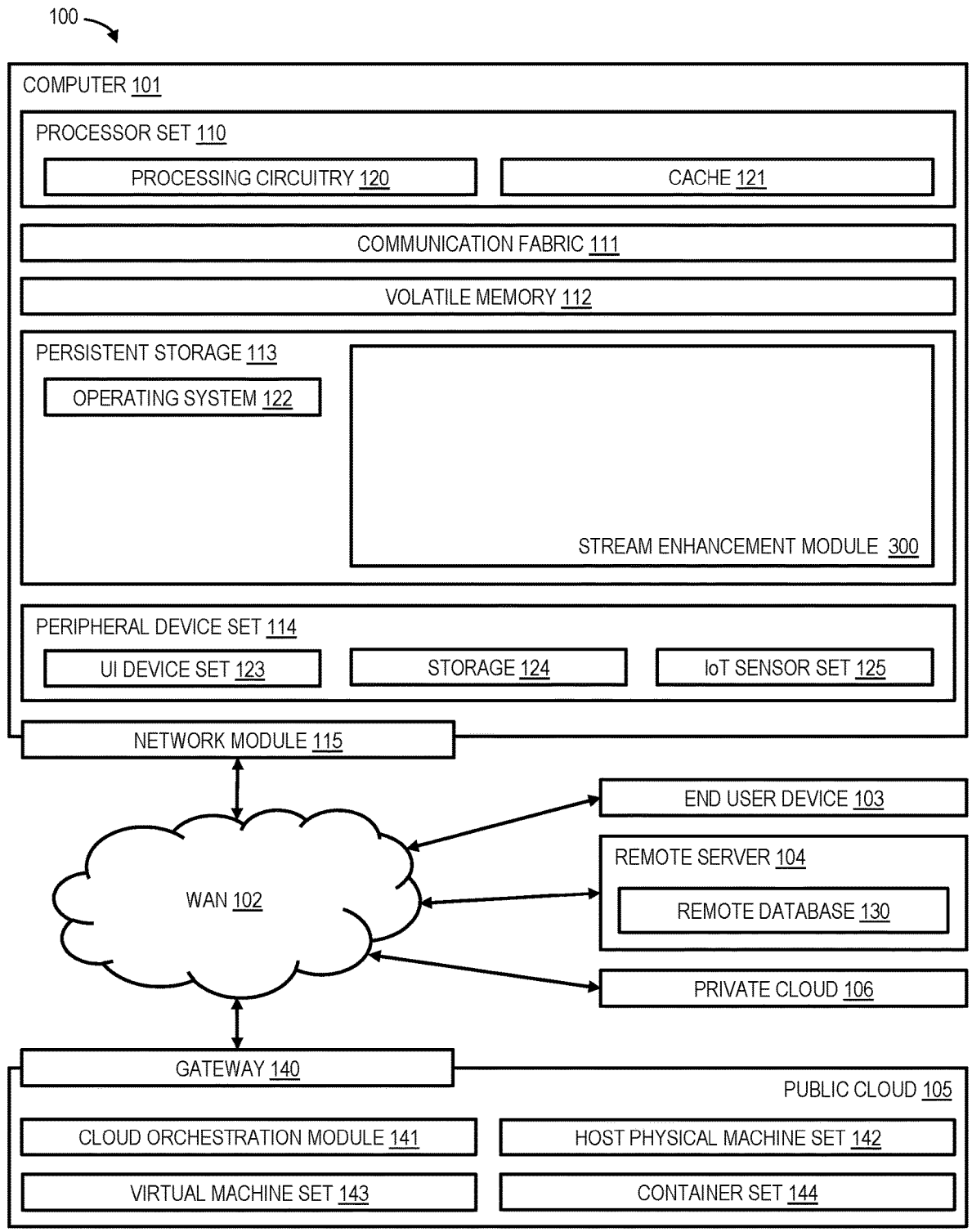
FIG. 1 depicts an example computing environment to incorporate and/or use aspects described herein.

One or more embodiments described herein may be incorporated in, performed by and/or used by a computing environment, such as computing environment 100 of FIG. 1.

As examples, a computing environment may be of various architecture(s) and of various type(s), including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing process(es) that perform any combination of one or more aspects described herein. Therefore, aspects described and claimed herein are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code of stream enhancement module 300. In addition to block 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 300, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 300 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above in FIG. 1 is only one example of a computing environment to incorporate, perform, and/or use aspect(s) of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

A stream producer device could be or encompass computer 101, remote server 104, and/or one or more computing systems of private cloud 106 and/or public cloud 105, as examples. A stream consumer device could be or encompass computer 101 and/or EUD 103, as examples.

In accordance with some aspects described herein, methods are provided that optimize the process of detecting and capturing items (e.g. information, regions, objects, content, etc.), within the stream, that are of interest (e.g. oriented-to, relevant, etc.) to stream consumers of the stream. This can benefit stream consumers by enabling them to selectively process the stream and/or portions thereof, or optimize resource (CPU, graphics processing unit, memory, network, and other resources) usage based on items/regions of interests, as examples. Metadata describing items of interest can be automatically generated by producer(s) of a stream, and based, for instance, on preferences of the stream consumers. This metadata can be provided to the stream consumer devices for use of that metadata, for instance use by a stream consumer device to tailor its processing to those items and, optionally, avoid unnecessary or undesired processing of items not of interest to the stream consumer, as described herein. By way of specific example and not limitation, in a multimedia stream depicting a professor giving a lecture in front of a classroom and working from a whiteboard (both of which may be viewable in the stream), an item of interest in the stream might be the whiteboard and a stream consumer device might be configured to identify from the metadata the whiteboard and its location within the stream, and render, for display to the stream consumer (user) of the device, only that portion of the stream video that the whiteboard occupies, thereby effectively cropping the video for display of only the whiteboard on the stream consumer device. Many other examples of tailored processing are possible, some of which are described herein.

A multimedia stream refers to a stream of audio/video data sent by a stream producer to one or more consumers of the audio/video data. The stream consumer(s) receive the audio/video data for playing to a user, typically on the stream consumer device itself. The stream is sometimes, though does not need to be, a stream of real-time activity, such as a live video of meeting participants engaged in a conversation. Various video conferencing/videotelephony services, for instance, exist for real-time collaboration among 'meeting' participants in a streaming session. The devices of the participating uses are stream consumers that receive a stream, e.g., of the video/audio of the participants of the video conference for play (audio/audio) on the participating users' devices.

The broadcast of an ongoing sporting or other activity while the event is ongoing is another example of a stream of content in real-time. In addition, pre-recorded content can be pushed out to consumers as part of a stream that the consumer can optionally load for viewing in real-time (as the programming is aired). Other streams could be provided 'on-demand' to a streaming consumer as part of a streaming session in which the consumer requests the content from the stream producer and the stream producer responds by obtaining and sending the data to the stream consumer. Many on-demand programming is provided to viewers in this manner.

Aspects optimize the capture of relevant information in a streaming session by having the stream producer perform analysis of the multimedia stream to identify items of interest in the stream and then build and share with the stream consumers metadata about the multimedia stream, for instance metadata describing the identified items of interest. This analysis and provision of metadata can occur while the stream to the stream consumers is in progress and ongoing. Additionally, in some embodiments the stream consumers of the stream can provide feedback to the stream producer. The feedback can, for example, identify items that are not of interest to a consumer, identify that more detailed metadata about an item of interest is desired, or identify that metadata about an item of interest has not been provided but is requested. The stream consumer devices can use the metadata to inform/tailor their local (e.g., on device) processing to perform any desired actions that the stream consumer desires.

Instead of having each stream consumer device—each device that receives the stream—perform local analysis of the audio and video being streamed to it, the stream producer device generating the stream can perform the analysis of that multimedia content locally, i.e., at the stream producer device, and share with the consumers of that stream the information/metadata about the stream and items of interest. The metadata is relatively small compared to the size of the audio/video data being sent and received as the multimedia stream. In particular examples, the multimedia stream is provided by a stream producer device to a stream consumer device using User Datagram Protocol (UDP) and the metadata is provided by the stream producer device to the stream consumer device using Transmission Control Protocol (TCP), where the multimedia and metadata are provided using these two parallel channels of communication between the produce and consumer devices. In other examples, the metadata may be provided as part of the audio/video data over UDP, if desired.

The metadata describing items of interest in the multimedia stream might change over time, for instance as different items of interest come and go across the duration of the multimedia content and/or as stream consumer feedback influences what the stream producer is to provide in terms of metadata. Meanwhile, the multimedia stream could be of any length, including, for instance, several hours in duration. Consequently, in some embodiments updated metadata is generated by the stream producer and sent periodically, aperiodically, or continuously to stream consumer devices. The frequency with which the metadata being provided to the stream consumers is updated and/or sent can vary based on the particular nature of the items of interest involved or the content streamed. For instance, if a chalkboard is an item of interest and both the chalkboard and the camera capturing the view to the chalkboard remain stationary, then the region, in the video frame, where the chalkboard appears will generally not change over time, and therefore location information describing to the stream consumers the location of the chalkboard would not need to be updated. Absent any need to update for the stream consumers other information pertaining to that item of interest (such as if the content shown or written on the chalkboard is being changed), it may not be necessary to generate and send updated metadata describing that item of interest because that metadata might not change. In contrast, if the item of interest is an object that is updated or its position changes across a collection of video frames, then that might dictate updated metadata about that item be sent to the stream consumer devices. Furthermore, the particular stream consumers that are consuming the stream can change over time. As a new stream consumer joins the stream, it might be desired to send the most up-to-date metadata to that stream consumer, and such activity by the stream producer might be out-of-band relative to any metadata updating and sending it performs for the existing consumers of that stream. One object in providing metadata to the stream consumers may be to avoid sending different metadata to each different consumer and/or sending metadata at different times for each stream consumer. In this manner, it may be desired to send the same metadata to each stream consumer and to describe in the metadata only items of interest that are desired by the stream consumers, or at least that were not indicated as being undesirable by each of the stream consumers.

As noted, the metadata can describe the identified items of interest. In examples, the metadata includes, for each item of interest of the identified items of interest, an indication of the item of interest and an indication of a respective location, within video of the multimedia stream, of that item of interest. The metadata can contain details about the type of content analyzed, where to find it in the stream, and any other details about the item of interest. It is noted that the location within video of the stream could refer to the position/coordinates of the item within the video frame and/or where, in the duration of the stream, the item of interest is present. In the example of a moving racecar that is present in just one 10-second scene of the stream, the location information could therefore include the coordinate location of the racecar/pixel region in each video frame of the video frames spanning that 10 second duration and/or an identification of the specific 10-seconds, within the longer video, that the racecar appears. Frames could be consecutively numbered and the location information could be the frame numbers in which the racecar appears, for instance, as well as the regions, within each frame, that the racecar occupies. By way of another example, the stream might be of a live cooking segment in which a chef prepares a dish using a collection of ingredients depicted in the stream. An item of interest might be one of these ingredients—a carrot. The metadata might indicate the dish being prepared (regardless whether the dish has yet been prepared and displayed in the stream), the fact that there is a carrot used in the preparation of the dish, and the location of the carrot in the video. In addition, the metadata might also indicate (based on audio of the stream, for instance) the name of the local farm from which the carrot was sourced. An item of interest indicated in the metadata might be the name of that local farm. This latter item of interest is an example of one which is not 'depicted' within the stream but that may, nevertheless, be an item of interest existing in the multimedia stream. Metadata about any item of interest regardless whether it is a physical object or intangible piece of information about the multimedia stream, and regardless when or whether the item is shown in the stream, may be provided at any time during the stream. In examples, metadata is provided at the beginning of the stream or when a stream consumer being streaming the multimedia, which can enable the stream consumer to determine what tailored processing it should perform, either immediately or at an appropriate time.

With item of interest information (metadata), the stream consumers can directly trigger additional and tailored actions, such as capturing/isolating portions of the video, performing queries or other searches, saving mini-clips of multimedia when a particular item of interest is displayed in the stream and/or discussed, etc., without having to consume resources performing unnecessary processing of the audio/video or portions thereof.

In an additional use case, stream consumers can communicate and share with each other information (e.g. metadata) indicating other items of interest, for instance desired content, to form a consensus among the stream consumers. The consensus can indicate a consensus list of items built by the stream consumers. The list can present items about which the stream consumers want information, and therefore that the stream provider is to describe in metadata, for instance a set of items in which the stream consumers are interested and about which they desire metadata. The consensus can be determined among the stream consumers and then this information can be sent to the stream producer. The stream producer can perform additional analysis, for instance to locate the items of interest, if existing in the stream, and generate updated metadata if possible. Additionally or alternatively, the consensus list could be returned to the stream producer initially, before or at the beginning of the stream, and be used by the stream producer to identify the items of interest about which to build the initial set of metadata for sending sent out to the stream consumers.

Example tailored processing that a stream consumer might perform against the multimedia stream or specific items of interest can include any desired processing. The tailored processing could be based on some trigger, for instance based on detecting limited resources of the stream consumer device or on detecting network connectivity issues, for instance low available network bandwidth.

One example of tailored processing is dynamic manipulation of stream content. As an example, selective rendering of only certain segments of the stream might be used to accelerate and improve the streaming experience. These certain segments can correspond to item(s) of interest that the particular stream consumer has indicated is/are of interest. By way of example, if the stream includes a speaker whose only relevant movements are their hands, then the tailored processing might render for display on the stream consumer device only the speaker's hands. The metadata could indicate the hand position/movement as item(s) of interest and identify the position of the hands as a region of interest for rendering, should the stream consumer be interested in just the hand movements. The stream consumer could disregard some or all audio/video data not of or relating to the hand movements. In some examples, the stream consumer selectively receives only multimedia stream data pertinent to the tailored processing that it is to perform. In an alternative to relying on metadata for location information, such a region/item of interest could be defined manually by the stream consumer to identify the specific portion to render on demand, if desired.

Another example of tailored processing is dynamic manipulation of stream content based on the metadata and a determination of what the particular user of the stream consumer device is viewing most frequently and/or the visual information most relevant to that user. Eye tracking, for instance, to track which areas/items of the video that the viewer most often views/focuses on could inform the items of interest in which the user is most interested. The multimedia stream could be processed to render the video/audio associated with only those items, to the exclusion of the audio/video associated with other items within the content.

In yet another example, and building on the live cooking example above, tailored processing could be performed based on the items that are most of interest to the specific stream consumer/user, and identified by a profile kept for the user, by tracking where the user is looking, etc. In the cooking example, items of interest that are potentially most of interest to a given user could be the table, the chef, a particular ingredient or piece of equipment, etc. Interest points analysis can provide insights, for instance, on those items of interest during the stream. The metadata might indicate a location of in the video of each ingredient, and a particular user might visually focus on or explicitly request additional information about that ingredient. Based on this, the user can be presented with information about that ingredient in an overlay to the video, for example. The device of another stream consumer might process the identification of that ingredient to automatically perform a search to find and present local stores that carry that ingredient for sale. Meanwhile, another stream consumer device might process the metadata about the table to request of the stream producer more detailed metadata about that item, for instance request and indication of the table manufacturer.

The stream producer could selectively ignore or process and respond to such tailored requests to determine more detailed metadata about that item.

Thus, a methodology is provided for identifying items of interest (e.g. key information) for a particular audience, or audience member, that may be of more value than the overall stream itself. This can be done by way of an analysis of the stream itself, together with feedback from the audience members (stream consumers) in an effort to identify the information deemed to best serve the audience and its members.

In one aspect, stream analysis is performed by a stream producer. As part of this, basic information may be taken from the stream itself to identify potential items of interest. Camera position (e.g. steady state camera angle versus continuous or periodic change in the camera field of view) might affect the metadata and how often it is to be updated by the stream producer, as a change in the field of view is likely to change location of the items of interest in that field of view.

The identification of items of interest can be done by way of object recognition and/or a relevance comparison to provide and identify potential key items of interest in the stream for stream consumers. In one aspect, the multimedia stream is analyzed to determine candidate items of interest in the multimedia stream. The analysis can be done in real time or near real time as the stream is provided and/or can be done ahead of providing the stream to consumers, for instance in the case where the multimedia is produced ahead of time and provided on-demand for the stream consumers.

In an example, the analysis includes application of an artificial intelligence (AI) model to the multimedia stream to determine candidate items of interest. For instance, a pre-trained deep learning algorithm/model can be implemented to identify objects or other items. The model can be trained to identify particular objects (or other items) that might typically be considered relevant, such as chalk/markerboards, charts, projections to a screen, and any other trained items of interest. Optionally, value assessments can be performed on these items, ranking items most likely to contain or represent information of value. For example, identification of an apple on a desk, while an object, is unlikely to be "of interest" in most situations. It is noted, however, that the context of the multimedia can be taken into account. For instance, in a cooking demonstration, an apple on a counter or table might be, in this context, be highly relevant since it might be an ingredient used in the demonstration. Papers, posters, and other places of writing/sharing information might be deemed items of high value is most or all contexts.

In some embodiments, the stream producer maintains a list of 'items of interest' (for instance a list of items pre-specified by the stream producer that are expected to be of interest to stream consumers) and this can be mapped in a comparison to the candidate objects/items that the AI model identified. The stream producer, in identifying the items of interest to describe in the metadata initially sent to stream consumers, could determine which of these candidate items of interest are indicated by the items of interest list. By way of example, the AI model could identify an apple in the background of the video but if the 'apple' is not specified on the items of interest list pre-specified by the stream producer, the apple may not be identified as an item of interest about which metadata is to be provided, at least initially. Again, the context of the multimedia stream might, however, inform a different result. For instance, a stream producer that produces a stream of a live cooking segment might very well include 'apple' or an encompassing class (e.g., "food" or "ingredients") on its pre-specified items of interest list, in which case the apple detected by the AI would be represented on the items of interest list and therefore the stream producer might describe the apple in the metadata pushed out to the stream consumers. Even if metadata about the apple is not in an initial set of metadata sent out to the stream consumers, it might be added later if user(s) indicate (e.g., by way of feedback as described herein) an interest in the apple.

In some examples, only the portions/items of the multimedia stream that correspond to an identified "item of interest", as identified by the stream producer, will have metadata shared with the stream consumers of the stream, at least initially. Values assigned to these items can represent both the existence of the item in the list of "items of interest" as well as the relative interest the consumers are showing towards a particular item identified. Thus, upon identification of items of interest, an inventory of these may be created with accompanying locations within the multimedia stream. For instance, a markerboard being displayed could be identified and the area of the markerboard (as seen by the camera capturing the video of the stream) could be mapped and identified by the metadata. With ease moving forward, the locations could be enhanced and/or become the primary focus for stream consumers of the stream produced and output by the stream producer.

As noted, feedback from the stream consumers—users, by way of their device that receives and displays the stream—can be available in the event items not of interest are mapped and presented by the stream producer in metadata, or in the event information (or additional information) about an item in the multimedia stream is requested by the stream consumer(s). For example, a poster in the background of a scene depicted in the video could be clicked-on by a stream consumer and the stream consumer could indicate lack of interest in that item or request to remove that item from the metadata being provided. In this manner, the feedback from a stream consumer device can indicate that an identified item of interest (i.e., one described by the provided metadata) is not actually of interest to this stream consumer. Based on this, and perhaps contingent upon the stream producer receiving such an indication from each of the current stream consumers that are presently receiving the stream, the stream producer can use this feedback to generate updated metadata that omits/remove the metadata describing that identified item.

Additionally, as noted, stream consumers might also cause the stream producer to expand the set of items of interest maintained by the stream producer and/or about which the stream producer generates and provides metadata. This may be done by the stream consumers providing, to the stream producer, feedback indicating a request for more detailed metadata about an item of interest described by the provided metadata and/or a request for metadata describing an item, in the multimedia stream, not already described by the provided metadata, as examples. The stream producer can use this feedback to update the metadata and include the requested more detailed metadata or the requested metadata describing the item not already described by the provided metadata. It is noted that the stream producer can determine whether or not it is willing to and/or capable of performing the corresponding analysis of the stream needed to identify the additional items of interest that are "desired" by the consumer(s) and/or obtain the additional information about the item of interest.

Other methodologies can also be employed, such as "eye-tracking" technology that identifies where stream consumers are visually focusing as they view the multimedia content. If it is determined that user(s) are visually focusing on specific item(s) of interest on their respective display devices and there is no metadata being provided by the stream producer about those item(s), then a mapping option can be triggered automatically to provide feedback, from the stream consumer device(s) to the stream producer, that indicates based on the eye-tracking the item(s) of interest. The stream producer can determine that the item(s) of interest is/are not already described by the provided metadata, and on that basis can analyze the multimedia to the extent necessary and build such metadata into updated metadata describing those item(s) of interest, for instance to include an indication of each of the item(s) and an indication of each of their locations.

Optionally, if certain items are receiving higher attention from the stream consumers (based on eye-tracking, zooming, etc.) these items can be flagged as 'prime' items of interest and given priority by as it applies to stream-bandwidth or rendering activity by the stream consumer device.

Metadata sent by the stream producer to stream consumers joining the stream could be the metadata about any already-identified item of interest. If initially 10 items are identified and described to the stream consumers at the start of the stream, any stream consumer that later joins can be presented with the metadata of those identified items. In examples, once an item is mapped and included in metadata, it is mapped permanently for all stream consumers during that stream, i.e. included in the metadata for everybody, including existing and newly joining stream consumers. If feedback from consumer(s) prompts the stream producer to describe additional items of interest in metadata it sends out and/or to de-identify items of interest to causing the stream producer to omit metadata about those items, then such additions or deletions could optionally be provided to newly joining stream consumers. In examples, the latest version of the metadata, i.e., incorporating the additions/deletions, could be provided to the newly joining stream consumers.

Optionally, such modifications to the initial metadata could influence the stream producer when producing metadata for other streaming sessions. In this manner, a stream producer that streams the multimedia again or that streams other multimedia with similar items of interest could learn from the feedback provided by stream consumers and potentially include, or omit, metadata that the stream producer would otherwise have included in the initial metadata of such re-stream or other multimedia. Additionally or alternatively, feedback provided by a stream consumer of one multimedia stream could be saved as part of a user profile for that consumer, and that user profile can inform feedback that the stream consumer automatically provides when the stream consumer streams other multimedia. For instance, if a user routinely indicates lack of interest in a particular type of item of interest, then it might be assumed that going forward the user is not interested in that type of item of interest in any multimedia that the user streams to the user's device. Accordingly, feedback to any stream producer presenting a different stream that incorporates such item could be automatically sent by the stream consumer device to the stream producer without the user having to go through the process of indicating lack of interest in that item in the different stream.

Decisions can be made based upon current and prior stream consumer information (for instance past metadata requested, eye mapping, etc.) to help determine which items of interest are most of value to each stream consumer, and on a user-by-user basis. This information can then be utilized by the stream consumer devices to tailor their respective processing in any way desired. One stream consumer device might use the metadata identifying a markerboard and its location to render for the user only the image/video data of the markerboard, effectively replacing the video showing the entire frame with video showing just the markerboard (as an enhanced zoom). Another stream consumer device might dedicate the bulk of graphics resources to the rendering of the lecturer and a displayed slide show, and very little resource to rendering the background portions and areas around the slide show and lecturer, as another example. Yet another stream consumer might take the identification of particular object the lecturer is holding and initiate a lookup of the object manufacturer, customer reviews of the object, and a list of online marketplaces selling the object, as yet another example.

The metadata received by the stream consumer devices can thus be used to trigger different desired actions, and such tailored processing of one stream consumer can be completely independent and different from tailored processing of another stream consumer. Some such actions might have an objective of improving the overall experience of the stream consumer (user) when consuming the stream. While some tailored processing might reduce resource consumption or avoid processing activity that would otherwise be performed if the metadata were not provided, other tailored processing to improve the experience might result in additional resource consumption, such as additional battery drain of the stream consumer device. Accordingly, based on pre-configured settings related to the type of stream consumer device being used to access the stream, metadata and tailored processing could be totally ignored/avoided if the potential impact of the corresponding trigger and tailored processing might have an adverse effect on the battery life, power consumption, or other resources.

Figure 2:
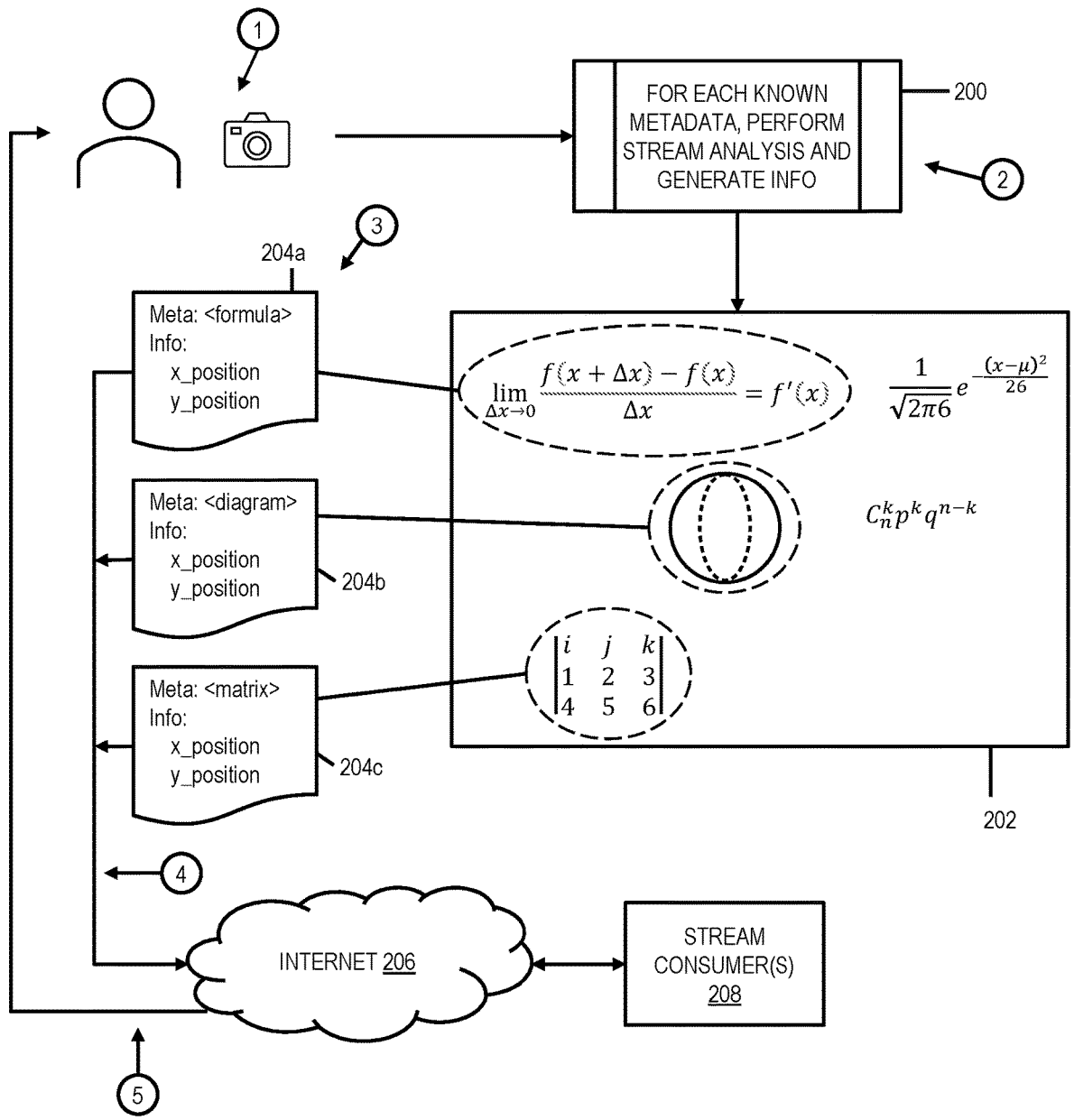
FIG. 2 depicts an example conceptual diagram of multimedia stream enhancement, in accordance with aspects described herein.

FIG. 2 depicts an example conceptual diagram of multimedia stream enhancement in accordance with aspects described herein. At 1, the stream producer (represented by a user and video capture device in FIG. 2) generates multimedia content which is input as a stream to a multimedia analysis module 200 that, for each type of known metadata, performs stream analysis and identifies items of interest in the multimedia stream at 2. In this example, the multimedia stream includes content depicted on a chalkboard shown by 202. The content relates to an educational lesson that is being given on various mathematical concepts. The analysis, at 3, identifies three items of interest in this example and produces respective metadata 204a, 204b, 204c describing these items of interest, and including the location (position here) of the item on the chalkboard 202 in the video frame. Here, the producer identifies three items of interest—a formula, a diagram and a matrix, and hence metadata 204a indicates a formula in the top left portion of the chalkboard, metadata 204b indicates a diagram and position thereof below the formula, and metadata 204c indicates a matrix and position thereof below the diagram. The stream producer can provide (at 4) the stream and metadata 204a, 204b, 204c to stream consumer(s) 208 via the internet 206. At this point, the stream consumers might be satisfied with the provided metadata—neither interested in additional items nor indicating that extraneous metadata has been provided (e.g., metadata of item(s) not of interest). The stream consumer devices can use the received metadata to identify items of interest in the stream and perform tailored processing based on/using those items. For instance, one or more stream consumers might use the metadata about the formula to lookup a proof of that formula, another one or more might use the metadata about the diagram to isolate that diagram in the video being rendered on those stream consumer device(s), and another one or more might use the metadata about the matrix and the metadata about the diagram to render those two item(s) as part of a crop of the video (to thereby remove or fail to render other content from the stream). There may be no feedback to send back to the stream producer to request changes to the metadata. In other examples, feedback is provided at 5 by one or more stream consumers 208 to the stream producer and the feedback might prompt the stream producer to update the metadata, for instance to add metadata about an item of interest to one or more of the stream consumers 208 or remove/omit metadata about an item not of interest to any of the stream consumers 208. Any updates to metadata can be sent by the stream producer device to one, multiple, or all of the stream consumer device(s). This can occur immediately when any changes are made to the metadata, periodically, or based on predefined occurrences, such as a pause in dialog, change of camera view, transition to another scene, and so on.

It is noted that in some examples, even in situations where the stream consumers do not manually indicate feedback to provide, there might be feedback automatically sent to the stream producer that indicates actions/processing being performed on the stream consumer device side. The stream producer might use that to augment the metadata or remove some metadata. If, for instance, stream consumer devices indicate back to the stream producer the fact that no stream consumer device is using metadata about a particular item of interest identified by the stream producer in provided metadata, the stream producer might determine to no longer include that metadata in updated metadata that it provides, unless and until a stream consumer explicitly requests such metadata.

Thus, over time, some metadata that had previously been provided might be omitted from updated metadata that is sent out, for instance if each stream consumer device indicates (explicitly or implicitly, by not using that metadata for tailored processing) lack of interest in that metadata. A stream producer might therefore prune metadata describing 10 items to metadata describing 8 items. If another stream consumer joins the stream, the stream producer might continue providing to each stream consumer the metadata of only the 8 items unless and until the newly joining stream consumer indicates an interest in metadata about those 2 other items. Alternatively, the stream producer might send updated metadata about all 10 items either just to that newly joining stream consumer or to all stream consumers. The stream producer might thereafter determine to drop the metadata of the 2 other items unless the new joiner indicates that it is interested in it, or if it is determined that the new joiner is not performing any tailored processing using that metadata.

Accordingly, streaming content enhancement and tailored process, such as manipulation of the content by the stream consumers, in accordance with aspects described herein can include various concepts. The multimedia content/stream may be a real-time (live) stream generated by a streamer (stream producer) of the multimedia content. Configurable metadata and configuring of the associated triggers for providing that metadata are provided. In cases where there is interest by one or more stream consumers for metadata about a particular item, metadata about such item can be requested of the stream producer and the stream producer can generate the metadata and provide it to the stream consumers. A module may be provided to check user (stream consumer) profiles to identify the best metadata to provide to the stream consumers. A rank can be generated to ensure that the best metadata is generated and provided. The stream producer can incorporate/use a handling component to periodically or aperiodically check for metadata and process requested data by the stream consumers. Triggers and output management component can be provided that enables the individual stream consumers having different desires for metadata and different actions that they perform against the multimedia stream using that metadata to share indications of that desired metadata with the stream producer and/or other stream consumers, for instance to arrive at a consensus as to metadata desired, the consensus for providing to the stream producer to prompt the stream producer to analyze the stream for metadata about those items of interest and provide it, if available, to the stream consumers.

Another example of aspects described herein is as follows: A streamer produces live multimedia data (video, voice, screen sharing) on a mathematics class. The session has 1000 users consuming the content in real-time. Assuming relatively limited bandwidth of most users and ongoing problems on the network(s) that the stream producer device and stream consumer devices use to communicate, the stream producer device determines the need to provide metadata to the stream consumer devices to enable them to selectively render items of interest in the stream. In this case, the stream producer generates metadata via deep learning, identifying the area(s) of interest, for instance a small part of the stream showing a whiteboard where mathematical operations are being performed. Metadata indicating this whiteboard and the location in the stream can be sent to the stream consumer devices and one or more of the stream consumer devices can automatically process that metadata information to identify exact areas of the video to render, and thereby reduce what is rendered on the consumer devices to just the specific location of the whiteboard. As an enhancement, if the stream producer recognizes that all stream consumers are performing similar processing to crop out everything except the whiteboard from the stream, the stream producer could, on its end, automatically crop/clip the video data provided by the video capture device such that the only video being packed into the multimedia stream is video showing the whiteboard. This enhancement would relieve the stream consumer devices from performing such tailored processing, and in this manner tailored processing can be performed by the stream producer if desired.

Aspects described herein can include analyzing an input stream to obtain information that is relevant to the stream consumers actually consuming the content at any given point in time, enabling them to consume and display (for instance) only the items of interest to the consumers.

Figure 3A:
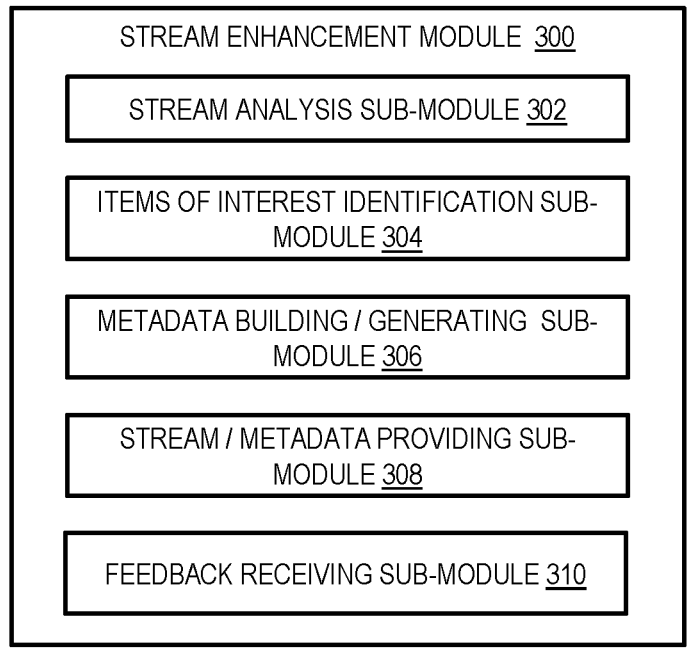
FIGS. 3A and 3B depict further details of example stream enhancement modules to incorporate and/or use aspects described herein.
Figure 3B:
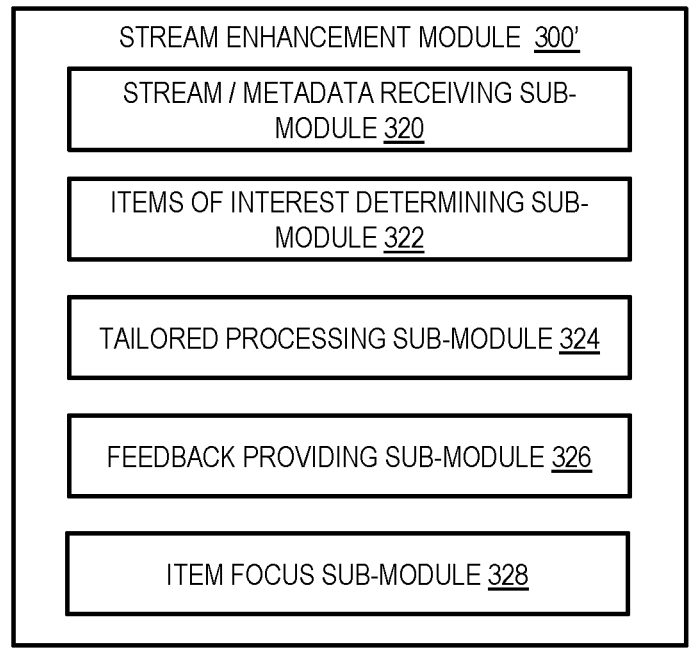

FIGS. 3A and 3B depict further details of example stream enhancement modules (e.g., stream enhancement module 300 of FIG. 1) to incorporate and/or use aspects described herein. In one or more aspects, stream enhancement module 300 includes, in one example, various sub-modules to be used to perform stream enhancement processing. The sub-modules can be or include, e.g., computer readable program code (e.g., instructions) in computer readable media, e.g., persistent storage (e.g., persistent storage 113, such as a disk) and/or a cache (e.g., cache 121), as examples. The computer readable media may be part of a computer program product and may be executed by and/or using one or more computers or devices, and/or processor(s) or processing circuitry thereof, such as computer(s) 101, EUD 103, server 104, or computers of cloud 105/106 of FIG. 1, as examples.

Referring to FIG. 3A, which shows an example stream enhancement module 300 for performing activities of a stream producer, module 300 includes a stream analysis sub-module 302 to automatically analyze a multimedia stream. In an example, the analysis applies an AI model to the multimedia stream to determine candidate items of interest that exist in the multimedia stream. Module 300 also includes an items of interest identification sub-module 304 to identify, based on the analyzing, items of interest in the multimedia stream. In an example where candidate items of interest are first determined, e.g., by an AI module, the identification (by sub-module 304) of the identified items of items of interest can include comparing the candidate items of interest to an items of interest list that is maintained by the stream producer device and determining which of the candidate items of interest are indicated by that items of interest list. The identified items of interest (identified for provision of metadata about such items, for instance) may be identified as those candidate items of interest from the analysis 302 that are also indicated by the items of interest list. It is noted that the items of interest list might change over time, for instance dynamically during a stream based on stream consumer feedback, for example. Thus, such comparison might take place more than once over the duration of the stream in order to potentially update the metadata as described herein.

Continuing with FIG. 3A, the module 300 also includes a metadata building/generating sub-module 306 that builds metadata about the multimedia stream. The metadata describes the identified items of interest and includes, for each such item of interest of the identified items of interest, an indication of the item of interest and an indication of a respective location, within video of the multimedia stream, of that item of interest. Module 300 additionally includes a stream/metadata providing sub-module 308 that the stream provider uses to provide the multimedia stream and the metadata to stream consumer device(s). Module 300 also includes a feedback receiving sub-module 310 for receiving feedback from at least one stream consumer device of the stream consumer device(s) as the stream producer device provides the multimedia stream to the at least one stream consumer device.

In some aspects, the feedback received by sub-module 310 can be used to generate (e.g., by sub-module 306) updated metadata about the multimedia stream. Such updated metadata can be for provision (e.g., by sub-module 308) to one or more of the stream consumer device(s). In some examples, the feedback indicates a request for more detailed metadata about an item of interest described by the provided metadata, and use of the feedback by the stream provider generates the updated metadata to include the requested more detailed metadata about the item of interest. Additionally or alternatively, the feedback can indicate a request for metadata describing an item, in the multimedia stream, not already described by the provided metadata, and use of the feedback generates the updated metadata to include the requested metadata describing the item not already described by the provided metadata.

As another example, the feedback received by sub-module 310 can indicate at least one of the identified items of interest, described by the provided metadata, that is not of interest. Use (e.g., by sub-module 306) of such feedback can generate the updated metadata by removing, from the built metadata, the metadata describing the at least one of the identified items of interest and/or omitting such metadata from being included in updated metadata that is sent out.

As yet another example, the feedback received by sub-module 310 can include feedback from several stream consumer devices that receive the stream and can indicate, based on eye tracking, at least one item of interest, in the multimedia stream, on which a respective plurality of users of the plurality of stream consumer devices visually focus. Use of that feedback (e.g., by sub-module 306) can include determining that the at least one item of interest is not already described by the provided metadata, and including, in the updated metadata, as metadata describing the at least one item of interest, an indication of each of the at least one item of interest and an indication of a respective location, within the video of the multimedia stream, of each of the at least one item of interest.

The feedback can inform the stream producer of tailored processing that the stream consumers are performing. The producer can use such feedback to determine whether/how to update the metadata, for instance to (i) provide more information about an item of interest that is already described by the metadata and that the consumers are using in tailored processing, (ii) provide information about an item that the metadata does not yet describe but might benefit the stream consumers' tailored processing if described, and/or (iii) eliminate metadata about an item that is not being used in the tailored processing. Thus, the feedback can include indications of processing that at least one stream consumer device performs against the multimedia stream based on the provided metadata. Use (e.g., by sub-module 306) of the feedback to generate the updated metadata can include, based on the indications of processing indicating use of the metadata describing an identified item of interest, including, in the updated metadata, additional detail describing the identified item of interest. Additionally or alternatively the use can include, based on the indications of processing indicating processing against an item, in the multimedia stream, not already described by the provided metadata, including, in the updated metadata, metadata describing the item. Additionally or alternatively, the use can include, based on the indications of processing indicating stream consumer device(s) do not use the metadata, included in the provided metadata, describing an identified item of interest in the processing performed against the multimedia stream, removing, from the built metadata, the metadata describing that item of interest.

Module 300 can receive, e.g. by sub-module 310 or 304, an indication of a consensus list of items about which the stream producer device is to provide metadata to the stream consumer devices. Such consensus list can be a consensus among the stream consumer devices, where (i) the building (e.g., by sub-module 304) the metadata initially sent to the consumers and/or (ii) the generating (e.g., by sub-module 304) of updated metadata uses the consensus list to inform which items in the multimedia stream are to be described to the stream consumer devices.

In examples where the multimedia stream includes a scene captured by a camera, then based on a change in location of an item, of the identified items of interest, in a field of view of the camera, sub-module 306 can update the provided metadata to update the indication of the respective location, within video of the multimedia stream, of that item to reflect a changed location of the item.

Referring now to FIG. 3B, which shows an example stream enhancement module 300' for performing activity of a stream consumer device, module 300' includes a stream/metadata receiving sub-module 320 that receives, from a stream producer device, for instance a sub-module 308 thereof, a multimedia stream and metadata describing identified items of interest in the multimedia stream. Module 300' also includes an items of interest determining sub-module 322 for determining, from the received metadata, the identified items of interest indicated by the metadata, and selecting a subset of items of interest, of the identified items of interest, for which tailored processing is to be performed. Module 300' also includes a tailored processing sub-module 324 to perform tailored processing against the multimedia stream (for instance portions thereof pertaining to one or more identified items). The metadata about the subset of items can be used to perform processing tailored to those items, and any metadata about the other items, not in the subset, described by the metadata is not used, and no tailored processing relative to those other items is performed. Example tailored processing modifies the multimedia stream, for instance to render selected portion(s) of the video and exclude from display other portions of the stream. In some examples, the modifying augments the multimedia with some text about one or more item(s) of interest in the subset.

Module 300' also includes feedback providing sub-module 326 for providing, to the stream producer, e.g. to sub-module 310 thereof, feedback as the stream consumer device receives the multimedia stream. The feedback can be any kind described herein and can be used by the stream producer in any way described herein. Module 300' also includes item focus sub-module 328 for determining at least one item of interest, in the multimedia stream, on which a user of the stream consumer device visually focuses. This can be provided as feedback to the stream producer.

Focus determination may be based on eye-tracking, as one example. In a specific example, sub-module 328 uses sensors of the stream consumer device to perform eye tracking of the user of the stream consumer device and determines the item(s) on which the user visually focuses. Sub-module 328 and/or sub-module 326 can then provide a request for metadata about such item(s), if not already provided. Updated metadata can then be received from the stream producer device and tailored processing (e.g., by sub-module 324) can include tailored processing based on that updated metadata and relative to those now-described item(s) on which the user visually focused.

Figure 4:
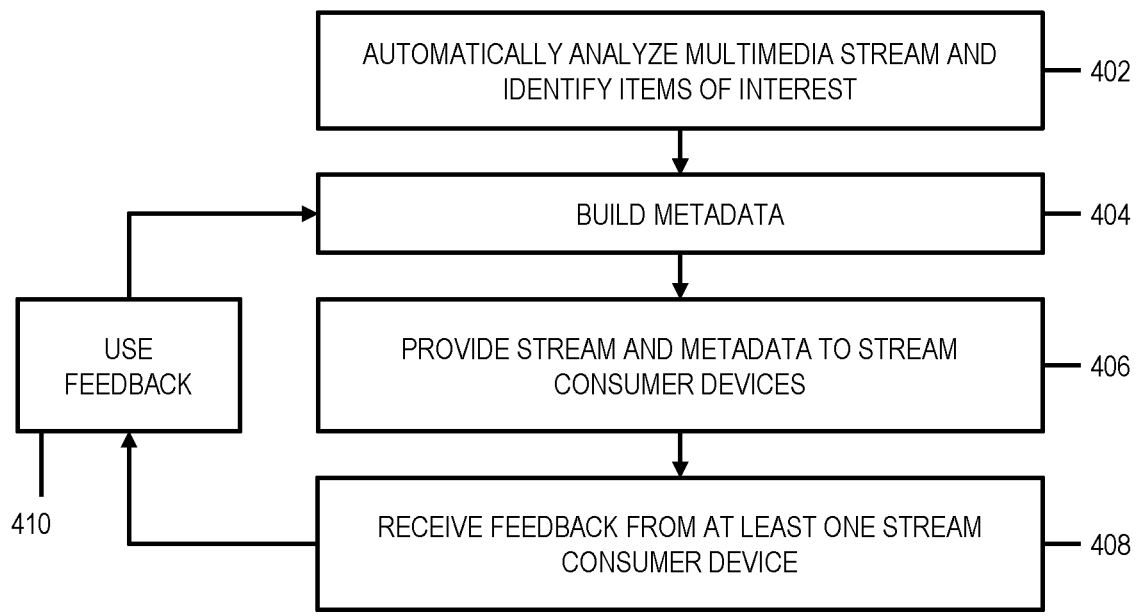
FIG. 4 depicts an example process for multimedia stream enhancement, in accordance with aspects described herein.

FIG. 4 depicts an example process for multimedia stream enhancement performed by a stream producer, in accordance with aspects described herein. The process may be executed, in one or more examples, by a processor or processing circuitry of one or more computers/computer systems, such as those described herein, and more specifically those described with reference to FIG. 1. In one example, code or instructions implementing the process of FIG. 4 are part of a module, such as module 300. In other examples, the code may be included in one or more modules and/or in one or more sub-modules of the one or more modules. Various options are available.

The process of FIG. 4 automatically analyzes (402) a multimedia stream and identifying, based on the analyzing, items of interest in the multimedia stream. The analysis looks into the multimedia stream and determines items to describe by way of metadata to the stream consumers. In a particular example, the analyzing the multimedia stream includes applying an artificial intelligence (AI) model to the multimedia stream to determine candidate items of interest that exist in the multimedia stream. The identifying of the items of interest in the multimedia stream can include comparing the candidate items of interest to an items of interest list that is maintained by the stream producer device, and determining which of the candidate items of interest are indicated by the items of interest list. The identified items of interest may then be identified as those candidate items of interest that are also indicated by that items of interest list.

The process of FIG. 4 continues by building (404) metadata about the multimedia stream. The metadata describes the identified items of interest and includes, for each item of interest of the identified items of interest, an indication of the item of interest and an indication of a respective location, within video of the multimedia stream, of that item of interest. The process then provides (406), by the stream producer device, the multimedia stream and the metadata to a plurality of stream consumer devices.

Over time, the stream producer might receive feedback from at least one stream consumer device as those stream producer provides the stream to that at least one device. The process can use (410) this feedback to generate (via 404) updated metadata about the multimedia stream for provision (via 406) to one or more of the stream consumer devices that are consuming the stream. For instance, the feedback from the at least one stream consumer device can indicate at least one selected from the group consisting of: (i) a request for more detailed metadata about an item of interest described by the provided metadata, and (ii) a request for metadata describing an item, in the multimedia stream, not already described by the provided metadata, and the use of the feedback generates the updated metadata to include the requested more detailed metadata or the requested metadata describing the item not already described by the provided metadata.

Additionally or alternatively, the feedback from the at least one stream consumer device can indicate at least one of the identified items of interest, described by the provided metadata, that is not of interest, and the use of the feedback generates the updated metadata by removing, from the built metadata, the metadata describing the at least one of the identified items of interest.

Additionally or alternatively, the feedback from the at least one stream consumer device can be feedback from the plurality of stream consumer devices (receiving the stream) that indicates, based on eye tracking, at least one item of interest, in the multimedia stream, on which a respective plurality of users of the plurality of stream consumer devices visually focus. The use of this feedback can include determining that the at least one item of interest is not already described by the provided metadata, and including, in the updated metadata, as metadata describing the at least one item of interest, an indication of each of the at least one item of interest and an indication of a respective location, within the video of the multimedia stream, of each of the at least one item of interest.

Additionally or alternatively, the feedback can inform the stream producer of tailored processing that the stream consumer devices that receive the stream are performing. The stream producer device can modify the metadata that it provides on the basis of this information. Thus, the feedback can include indications of processing that at least one stream consumer device performs against the multimedia stream based on the provided metadata, and the use of the feedback to generate the updated metadata can include one or more of the following: based on the indications of processing indicating use, by the at least one stream consumer in the processing performed against the multimedia stream, of metadata, included in the provided metadata, describing a first of the identified items of interest, including, in the updated metadata, additional detail describing the first identified item of interest, (ii) based on the indications of processing indicating processing, by the at least one stream consumer, against an item, in the multimedia stream, not already described by the provided metadata, including, in the updated metadata, metadata describing the item, and/or (iii) based on the indications of processing indicating that the at least one stream consumer does not use the metadata, included in the provided metadata, describing a third of the identified items of interest in the processing performed against the multimedia stream, removing, from the built metadata, the metadata describing the third item of interest.

In some embodiments, the stream producer device can receive an indication of a consensus list of items about which the stream producer device is to provide metadata. Such consensus list might reflect a consensus among the plurality of stream consumer devices as to what items of interest they wish to see described by the metadata, for instance to facilitate their tailored processing of the multimedia stream. The building of the initial metadata and/or the generating the updated metadata can thus use the consensus list to inform the stream producer of which items in the multimedia stream are to be described to the stream consumer devices.

In examples where the multimedia stream includes a scene captured by a camera, then, based on a change in location of an item, of the identified items of interest, in a field of view of the camera, the stream producer can further perform updating the provided metadata, which updates the indication of the respective location, within video of the multimedia stream, of that item to reflect a changed location of the item.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   automatically analyzing a multimedia stream and identifying, based on the analyzing, items of interest in the multimedia stream;
   building metadata about the multimedia stream, the metadata describing the identified items of interest and comprising, for each item of interest of the identified items of interest, an indication of the item of interest and an indication of a respective location, within video of the multimedia stream, of that item of interest;

providing, by a stream producer device, the multimedia stream and the metadata to a plurality of stream consumer devices;

receiving feedback from at least one stream consumer device of the plurality of stream consumer devices as the stream producer device provides the multimedia stream to the at least one stream consumer device; and using the feedback to generate updated metadata about the multimedia stream for provision to a stream consumer device of the plurality of stream consumer devices.

2. The method of claim 1, wherein the analyzing the multimedia stream comprises applying an artificial intelligence (AI) model to the multimedia stream to determine candidate items of interest that exist in the multimedia stream, and wherein the identifying the items of interest in the multimedia stream comprises:

comparing the candidate items of interest to an items of interest list maintained by the stream producer device; and determining which of the candidate items of interest are indicated by the items of interest list, wherein the identified items of interest are identified as those candidate items of interest that are also indicated by the items of interest list.

3. The method of claim 1, wherein the feedback from the at least one stream consumer device indicates at least one selected from the group consisting of: (i) a request for more detailed metadata about an item of interest described by the provided metadata, and (ii) a request for metadata describing an item, in the multimedia stream, not already described by the provided metadata, and wherein the using the feedback generates the updated metadata to include the requested more detailed metadata or the requested metadata describing the item not already described by the provided metadata.

4. The method of claim 1, wherein the feedback from the at least one stream consumer device indicates at least one of the identified items of interest, described by the provided metadata, that is not of interest, and wherein the using the feedback generates the updated metadata by removing, from the built metadata, the metadata describing the at least one of the identified items of interest.

5. The method of claim 1, wherein the feedback from the at least one stream consumer device is feedback from the plurality of stream consumer devices indicating, based on eye tracking, at least one item of interest, in the multimedia stream, on which a respective plurality of users of the plurality of stream consumer devices visually focus, wherein the using the feedback comprises:

determining that the at least one item of interest is not already described by the provided metadata; and including, in the updated metadata, as metadata describing the at least one item of interest, an indication of each of the at least one item of interest and an indication of a respective location, within the video of the multimedia stream, of each of the at least one item of interest.

6. The method of claim 1, wherein the feedback comprises indications of processing that at least one stream consumer device performs against the multimedia stream based on the provided metadata, and wherein the using the feedback to generate the updated metadata includes at least one selected from the group consisting of:

based on the indications of processing indicating use, by the at least one stream consumer device in the processing performed against the multimedia stream, of the metadata, included in the provided metadata, describing a first of the identified items of interest, including, in the updated metadata, additional detail describing the first identified item of interest;

based on the indications of processing indicating processing, by the at least one stream consumer device, against an item, in the multimedia stream, not already described by the provided metadata, including, in the updated metadata, metadata describing the item; and based on the indications of processing indicating that the at least one stream consumer device does not use the metadata, included in the provided metadata, describing a third of the identified items of interest in the processing performed against the multimedia stream, removing, from the built metadata, the metadata describing the third item of interest.

7. The method of claim 1, further comprising receiving an indication of a consensus list of items about which the stream producer device is to provide metadata, the consensus list being a consensus among the plurality of stream consumer devices, wherein at least one of the group consisting of (i) the building the metadata and (ii) the generating the updated metadata uses the consensus list to inform which items in the multimedia stream are to be described to the stream consumer devices.

8. The method of claim 1, wherein the multimedia stream comprises a scene captured by a camera, and wherein, based on a change in location of an item, of the identified items of interest, in a field of view of the camera, the method further comprises updating the provided metadata, the updating the provided metadata updating the indication of the respective location, within video of the multimedia stream, of that item to reflect a changed location of the item.

9. A computer system comprising:

a memory; and a processor in communication with the memory, wherein the computer system is configured to perform a method comprising:

automatically analyzing a multimedia stream and identifying, based on the analyzing, items of interest in the multimedia stream;

building metadata about the multimedia stream, the metadata describing the identified items of interest and comprising, for each item of interest of the identified items of interest, an indication of the item of interest and an indication of a respective location, within video of the multimedia stream, of that item of interest;

providing, by a stream producer device, the multimedia stream and the metadata to a plurality of stream consumer devices;

receiving feedback from at least one stream consumer device of the plurality of stream consumer devices as the stream producer device provides the multimedia stream to the at least one stream consumer device; and using the feedback to generate updated metadata about the multimedia stream for provision to a stream consumer device of the plurality of stream consumer devices.

10. The computer system of claim 9, wherein the analyzing the multimedia stream comprises applying an artificial intelligence (AI) model to the multimedia stream to determine candidate items of interest that exist in the multimedia stream, and wherein the identifying the items of interest in the multimedia stream comprises:

comparing the candidate items of interest to an items of interest list maintained by the stream producer device; and determining which of the candidate items of interest are indicated by the items of interest list, wherein the identified items of interest are identified as those candidate items of interest that are also indicated by the items of interest list.

11. The computer system of claim 9, wherein the feedback from the at least one stream consumer device indicates at least one selected from the group consisting of: (i) a request for more detailed metadata about an item of interest described by the provided metadata, and (ii) a request for metadata describing an item, in the multimedia stream, not already described by the provided metadata, and wherein the using the feedback generates the updated metadata to include the requested more detailed metadata or the requested metadata describing the item not already described by the provided metadata.

12. The computer system of claim 9, wherein the feedback from the at least one stream consumer device indicates at least one of the identified items of interest, described by the provided metadata, that is not of interest, and wherein the using the feedback generates the updated metadata by removing, from the built metadata, the metadata describing the at least one of the identified items of interest.

13. The computer system of claim 9, wherein the feedback from the at least one stream consumer device is feedback from the plurality of stream consumer devices indicating, based on eye tracking, at least one item of interest, in the multimedia stream, on which a respective plurality of users of the plurality of stream consumer devices visually focus, wherein the using the feedback comprises:

determining that the at least one item of interest is not already described by the provided metadata; and including, in the updated metadata, as metadata describing the at least one item of interest, an indication of each of the at least one item of interest and an indication of a respective location, within the video of the multimedia stream, of each of the at least one item of interest.

14. The computer system of claim 9, wherein the feedback comprises indications of processing that at least one stream consumer device performs against the multimedia stream based on the provided metadata, and wherein the using the feedback to generate the updated metadata includes at least one selected from the group consisting of:

based on the indications of processing indicating use, by the at least one stream consumer device in the processing performed against the multimedia stream, of the metadata, included in the provided metadata, describing a first of the identified items of interest, including, in the updated metadata, additional detail describing the first identified item of interest;

based on the indications of processing indicating processing, by the at least one stream consumer device, against an item, in the multimedia stream, not already described by the provided metadata, including, in the updated metadata, metadata describing the item; and based on the indications of processing indicating that the at least one stream consumer device does not use the metadata, included in the provided metadata, describing a third of the identified items of interest in the processing performed against the multimedia stream, removing, from the built metadata, the metadata describing the third item of interest.

15. The computer system of claim 9, wherein the method further comprises receiving an indication of a consensus list of items about which the stream producer device is to provide metadata, the consensus list being a consensus among the plurality of stream consumer devices, wherein at least one of the group consisting of (i) the building the metadata and (ii) the generating the updated metadata uses the consensus list to inform which items in the multimedia stream are to be described to the stream consumer devices.

16. The computer system of claim 9, wherein the multimedia stream comprises a scene captured by a camera, and wherein, based on a change in location of an item, of the identified items of interest, in a field of view of the camera, the method further comprises updating the provided metadata, the updating the provided metadata updating the indication of the respective location, within video of the multimedia stream, of that item to reflect a changed location of the item.

17. A computer program product comprising:

a computer readable storage medium readable by a processing circuit and storing instructions for execution by the processing circuit for performing a method comprising:

automatically analyzing a multimedia stream and identifying, based on the analyzing, items of interest in the multimedia stream;

building metadata about the multimedia stream, the metadata describing the identified items of interest and comprising, for each item of interest of the identified items of interest, an indication of the item of interest and an indication of a respective location, within video of the multimedia stream, of that item of interest;

providing, by a stream producer device, the multimedia stream and the metadata to a plurality of stream consumer devices;

receiving feedback from at least one stream consumer device of the plurality of stream consumer devices as the stream producer device provides the multimedia stream to the at least one stream consumer device; and using the feedback to generate updated metadata about the multimedia stream for provision to a stream consumer device of the plurality of stream consumer devices.

18. The computer program product of claim 17, wherein the analyzing the multimedia stream comprises applying an artificial intelligence (AI) model to the multimedia stream to determine candidate items of interest that exist in the multimedia stream, and wherein the identifying the items of interest in the multimedia stream comprises:

comparing the candidate items of interest to an items of interest list maintained by the stream producer device; and determining which of the candidate items of interest are indicated by the items of interest list, wherein the identified items of interest are identified as those candidate items of interest that are also indicated by the items of interest list.

19. The computer program product of claim 17, wherein the feedback from the at least one stream consumer device indicates at least one selected from the group consisting of:

(i) a request for more detailed metadata about an item of interest described by the provided metadata, wherein the using the feedback generates the updated metadata to include the requested more detailed metadata;

(ii) a request for metadata describing an item, in the multimedia stream, not already described by the provided metadata, wherein the using the feedback generates the updated metadata to include the requested metadata describing the item not already described by the provided metadata; and (iii) at least one of the identified items of interest, described by the provided metadata, that is not of interest, wherein the using the feedback generates the updated metadata by removing, from the built metadata, the metadata describing the at least one of the identified items of interest.

20. The computer program product of claim 17, wherein the feedback comprises indications of processing that at least one stream consumer device performs against the multimedia stream based on the provided metadata, and wherein the using the feedback to generate the updated metadata includes at least one selected from the group consisting of:

based on the indications of processing indicating use, by the at least one stream consumer device in the processing performed against the multimedia stream, of the metadata, included in the provided metadata, describing a first of the identified items of interest, including, in the updated metadata, additional detail describing the first identified item of interest;

based on the indications of processing indicating processing, by the at least one stream consumer device, against an item, in the multimedia stream, not already described by the provided metadata, including, in the updated metadata, metadata describing the item; and based on the indications of processing indicating that the at least one stream consumer device does not use the metadata, included in the provided metadata, describing a third of the identified items of interest in the processing performed against the multimedia stream, removing, from the built metadata, the metadata describing the third item of interest.

* * * * *